(12) United States Patent
Mayall (10) Patent No.: US 12,077,268 B2
(45) Date of Patent: Sep. 3, 2024

(54) LIFEBOAT

(71) Applicant: Zelim Limited, Denbigshire (GB)

(72) Inventor: Samuel Mayall, Clwyd (GB)

(73) Assignee: Zelim Limited, Denbighshire (GB)

( * ) Notice: Subject to any disclaimer, the term of this patent is extended or adjusted under 35 U.S.C. 154(b) by 832 days.

(21) Appl. No.: 16/969,603

(22) PCT Filed: Feb. 6, 2019

(86) PCT No.: PCT/GB2019/050323
§ 371 (c)(1),
(2) Date: Aug. 13, 2020

(87) PCT Pub. No.: WO2019/158904
PCT Pub. Date: Aug. 22, 2019

(65) Prior Publication Data
US 2021/0229784 A1    Jul. 29, 2021

(30) Foreign Application Priority Data

Feb. 13, 2018   (GB) ...................................... 1802321
Apr. 3, 2018    (GB) ...................................... 1805449

(51) Int. Cl.
*B63C 9/03*   (2006.01)
*B63B 27/14*  (2006.01)
(Continued)

(52) U.S. Cl.
CPC .............. *B63C 9/03* (2013.01); *B63B 27/143* (2013.01); *B63B 79/15* (2020.01); *B63C 9/28* (2013.01);
(Continued)

(58) Field of Classification Search
CPC ....... B63B 23/28; B63B 27/143; B63B 79/15; B63B 2035/006; B63C 9/02; B63C 9/03;
(Continued)

(56) References Cited

U.S. PATENT DOCUMENTS

| 5,492,076 A | 2/1996 | Kobayashi |
| 5,597,335 A | 1/1997 | Woodland |

(Continued)

FOREIGN PATENT DOCUMENTS

| EP | 2868570 A1 | 5/2015 |
| GB | 1585865 A | 3/1981 |

OTHER PUBLICATIONS

Wikipedia—"Man overboard rescue turn", accessed May 24, 2023.*
(Continued)

*Primary Examiner* — Jason Holloway
*Assistant Examiner* — Blake A Wood
(74) *Attorney, Agent, or Firm* — Bay State IP, LLC (57) ABSTRACT

An unmanned lifeboat 1 has a hull 2 with a transom opening 3, a fo'c'sle 4 closed by a rounded top deck 5, providing accommodation 6 for survivors. The aft deck as such is generally U-shaped with a cut-out 16 open at the transom17, which is vestigial with two small port and starboard parts. Within the cut-out is a boarding assistance ramp 18. This is level with the aft deck at its forward end and slopes down to the transom. It extends aft of this by a few of feet—say about 1 m—to enable survivors to swim and crawl onto it.

For guidance to reach the vicinity of the survivors, the lifeboat is equipped with a communication apparatus including a receiver 32 for receiving survivor location data. In addition, the navigation apparatus with which the lifeboat is equipped includes a GPS system 33 of its own, a compass 34.

16 Claims, 9 Drawing Sheets

(51) Int. Cl.
  *B63B 79/15* (2020.01)
  *B63C 9/28* (2006.01)
  *B63H 21/21* (2006.01)
  *G05D 1/00* (2024.01)

(52) U.S. Cl.
  CPC ........... *B63H 21/21* (2013.01); *G05D 1/0011* (2013.01); *G05D 1/0088* (2013.01); *B63C 2009/035* (2013.01)

(58) Field of Classification Search
  CPC ..... B63C 9/28; B63C 2009/035; B63H 21/21; G05D 1/0011; G05D 1/0088
  See application file for complete search history.

(56) References Cited

U.S. PATENT DOCUMENTS

| | | | | |
|---|---|---|---|---|
| 7,045,058 B2* | 5/2006 | Walczyk | ............... | E02B 15/048 |
| | | | | 210/242.1 |
| 2007/0051292 A1* | 3/2007 | Kilbourn | ................ | B63H 21/20 |
| | | | | 114/311 |

OTHER PUBLICATIONS

Written Opinion of the International Searching Authority, European Patent Office, May 22, 2019.
First Examination Report, European Patent Office, Sep. 1, 2021.
First Office Action, National Intellectual Property Administration of the P.R.C., Apr. 20, 2022.

* cited by examiner

LIFEBOAT

CROSS REFERENCE TO RELATED APPLICATION

This application is for entry into the U.S. National Phase under § 371 for International Application No. PCT/GB2019/050323 having an international filing date of Feb. 6, 2019, and from which priority is claimed under all applicable sections of Title 35 of the United States Code including, but not limited to, Sections 120, 363, and 365 (c) and which in turn claims priority under 35 USC 119 to UK Patent Applications No. 1802321.8 filed on Feb. 13, 2018 and No. 1805449.4 filed on Apr. 3, 2018.

There are many types of lifeboats. Their raison d'être is to save life. Some are provided on board ship to enable the passengers and crew to save themselves from a sinking ship and some are provided on land and crewed by organisations such as the RNLI, who go to the rescue of people in difficulty at sea.

Another class of lifeboat is known as a safety or standby boat, which is on standby, out to sea or close inshore, in case of accident. Safety boats are required in particular where helicopters are delivering personnel off shore, such as to marine wind turbines and oil & gas platforms. Such safety boats are expensive to have on station.

It is known to launch lifeboats down slides into the sea from shore stations and from off shore installations. In the latter, the crew accommodation is above the wave zone and lifeboats also are provided at the same level. When launched, they free-fall into the sea, dive below the surface and resurface further from the platform.

Such lifeboats are manned when launched.

The object of the present invention is to provide an improved lifeboat.

According to a first aspect of the invention there is provided an unmanned lifeboat, comprising:
- onboard casualty accommodation,
- a propulsion unit and steering gear,
- navigation apparatus,
- communication apparatus having a standby mode and adapted to receive an activation signal and a casualty's position and
- a controller operatively connected to the propulsion unit and steering gear, the navigation apparatus and the communication apparatus for:
- activating the propulsion unit and steering gear in response to receipt of the activation signal by the communication apparatus and
- conning the lifeboat in co-operation with the navigation apparatus towards the casualty position without on-board crew control and
- a low portion of a gunwale or transom of the hull via which a casualty can haul him/herself or be hauled aboard without on-board crew assistance.

The low portion could be provided in the gunwale, particularly in the form of an openable port. A more seaworthy provision of it is at the transom. In particular the low portion can be provided in a transom or a portion thereof set forwards of the rest of the transom.

The lifeboat is envisaged to be able to operate autonomously. Alternatively, and indeed as well, it is envisaged to be able to operate under control from a remote station with receipt of conning instructions by the communication apparatus for the controller.

Preferably, the controller is adapted to control the propulsion unit for a two stage approach enabling a relatively fast approach to the vicinity of the casualty and a relatively slow approach to the casualty per se. In particular, the lifeboat is envisaged to be free to operate at full speed, typically 20 to 30 knots, to within a certain range, typically ½ km, of the expected position of the casualty or casualties. Then within this range, but without a close range such as 100 m, it can approach at reduced speed, typically less than 10 knots. Within close range, it can approach at slow speed such as to enable a casualty to board. During the approach, the estimated position of the casualty, such as from adjustment of dead reckoning due to for instance wind or tide, or indeed from a newly received casualty position as from an PLB worn by a casualty or an EPIRB from a ditched aircraft from which the casualty has escaped. This casualty distance speed restriction can be set in the controller as a periphery of positions, typically a loop of latitude and longitude positions, within which speed is restricted. For this, and indeed other navigation, the navigation apparatus will include a GPS or equivalent instrument.

Normally the casualty position will be communicated to the lifeboat by radio transmission, in particular as a co-ordinate based position at least initially. However, it may be that the transmission is a direction finding transmission. It is expected that the initially position may be refined by a direction finding transmission, particularly a PLB where a casualty or a craft from which he or they have escaped has an EPIRB. Either a co-ordinate position or a directional heading, whether original or updated or dead-reckoning corrected, can be used for the fast initial approach.

A radio transmitted position/direction is unlikely to be adequate for the final slow approach to the casualty for recovery, bearing in mind that even if a casualty has an EPIRB transmitting a GPS position, even that is unlikely to be sufficiently accurate for positioning the transom or other low gunwale portion accurately at where the casualty is. Accordingly the lifeboat will normally be equipped with means for detecting the casualty on the surface of the sea for the controller to con the lifeboat to the casualty during the slow and final approach.

It can be envisaged that this could take radar or sonar form, even if not presently available. However the close approach means is preferably optically, particularly camera based. For this at least one camera is preferably provided. This may be sensitive to visible light such as from a high visibility jacket or survival suit or a jacket or suit having reflective strips or patches or an emergency light, typically a strobe light, or to infrared light as from a casualty's face and/or hands or both as from a flare.

Preferably, the casualty detection means is comprises at least two binocularly arranged cameras. These may be adjustable to be forward looking for slow approach ahead and to be aft looking for final approach astern. Normally, at least two pairs of cameras will be provided, one facing ahead and one astern. With these and the controller being programmed for casualty identification and binocular range calculation, it can guide the lifeboat dead slowly to the casualty or a series of casualties in turn, the upwind one first.

The lifeboat can be equipped with a lamp for lighting the casualty with light to which the cameras are sensitive for illuminating water around it for reflection from the casualty to be received by the controller.

Casualty recovery is best achieved by using a lifeboat as a protection from the full force of the wind and sea. This involves recovery astern and holding the lifeboat head to wind and sea, i.e. waves. The life boat of the invention being unmanned it is preferably equipped wind and/or sea-state detection means, in particular an anemometer and wind vane. Thus the controller is adapted to hold the lifeboat head to wind and/or sea-state with a casualty in the lee of the life boat and to manoeuvre the low portion of the lifeboat towards the casualty.

Where radio control conning to the casualty, as opposed to autonomous conning, the lifeboat can include means for transmitting wind and/or sea-state data and casualty images to the remote station for conning signal transmission to the control means for maneuvering towards the casualty.

In the preferred embodiment:
the low portion is provided at the stern with a ramp via which a casualty can board the lifeboat;
the ramp has a powered conveyor for hauling the casualty aboard and
the ramp is adapted for:
lowering of its distal end into the water for casualty recovery and
raising the distal end from the water when under way.

The ramp can also be adapted for extension beyond the transom retraction within the transom The lifeboat can be equipped for manual control, to enable a survivor once on board, to control it.

For many applications, the life boat is adapted for free fall launch.

Normally the lifeboat will be installed prior to use on a launching slip or slide, the slip or slide and/or the lifeboat being provided with means for releasing the lifeboat on receipt of the activation signal.

In particular, it is envisaged that the lifeboat will be stowed on a launch slide on a structure such as a marine wind turbine or a similar installation requiring up-keep by personnel accessing it via helicopter for instance. The slide and boat will normally be above the wave zone and the boat will be of the free fall type intended to submerge on launching and resurface again, whereupon the main engine will start for passage to the survivors' position.

The ramp of the autonomous/radio controlled life boat is envisaged to be useful in a manned lifeboat.

According to a second aspect of the invention there is provided a lifeboat, comprising:
a low portion of a gunwale or transom of the hull via which a casualty can haul him/herself or be hauled aboard and
a ramp at the low portion via which a casualty can board the lifeboat.

Preferably:
the ramp has a powered conveyor for hauling the casualty aboard; and
the ramp is adapted for
lowering of its distal end into the water and/or extension beyond the transom for casualty recovery and
raising the distal end from the water and/or retraction within the transom when under way.

To help understanding of the invention, a specific embodiment thereof will now be described by way of example and with reference to the accompanying drawings, in which.

Referring to the drawings a lifeboat 1 is shown having a self-righting hull 2 with a transom opening 3, a fo'c'sle 4 closed by a rounded top deck 5, providing accommodation 6 for survivors. A conning bridge 7 is provided above and aft of the accommodation, with a companionway ladder 8 leading to it. The bridge is equipped with the normal navigational equipment of the lifeboat or standby boat. The accommodation is accessed via a bulkhead door 9 from an aft deck 10.

The forward part 11 of the aft deck is formed as a shelter 12 for survivors, being beneath the bridge and protected on either side by wings 14 projecting back from sloping side portions 15 of the top deck. The aft deck as such is generally U-shaped with a cut-out 16 open at the transom 17, which is vestigial with two small port and starboard parts. Within the cut-out is a boarding assistance ramp 18. This is level with the aft deck at its forward end and slopes down to the transom. It extends aft of this by a few of feet—say about 1 m—to enable survivors to swim and crawl onto it.

Figure 1:
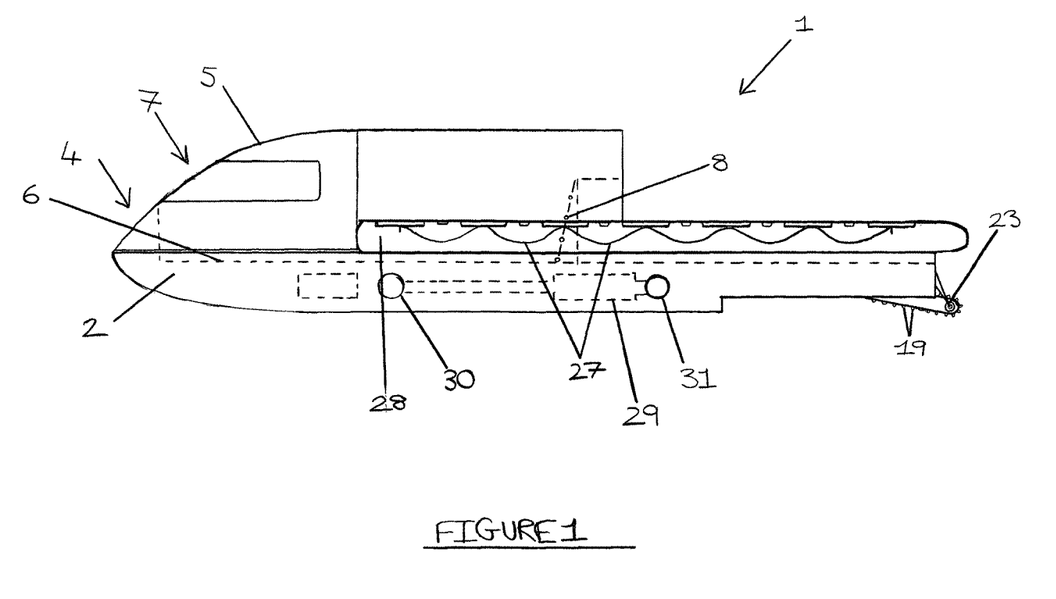
FIG. 1 is a side view of a lifeboat in accordance with the invention.
Figure 2:
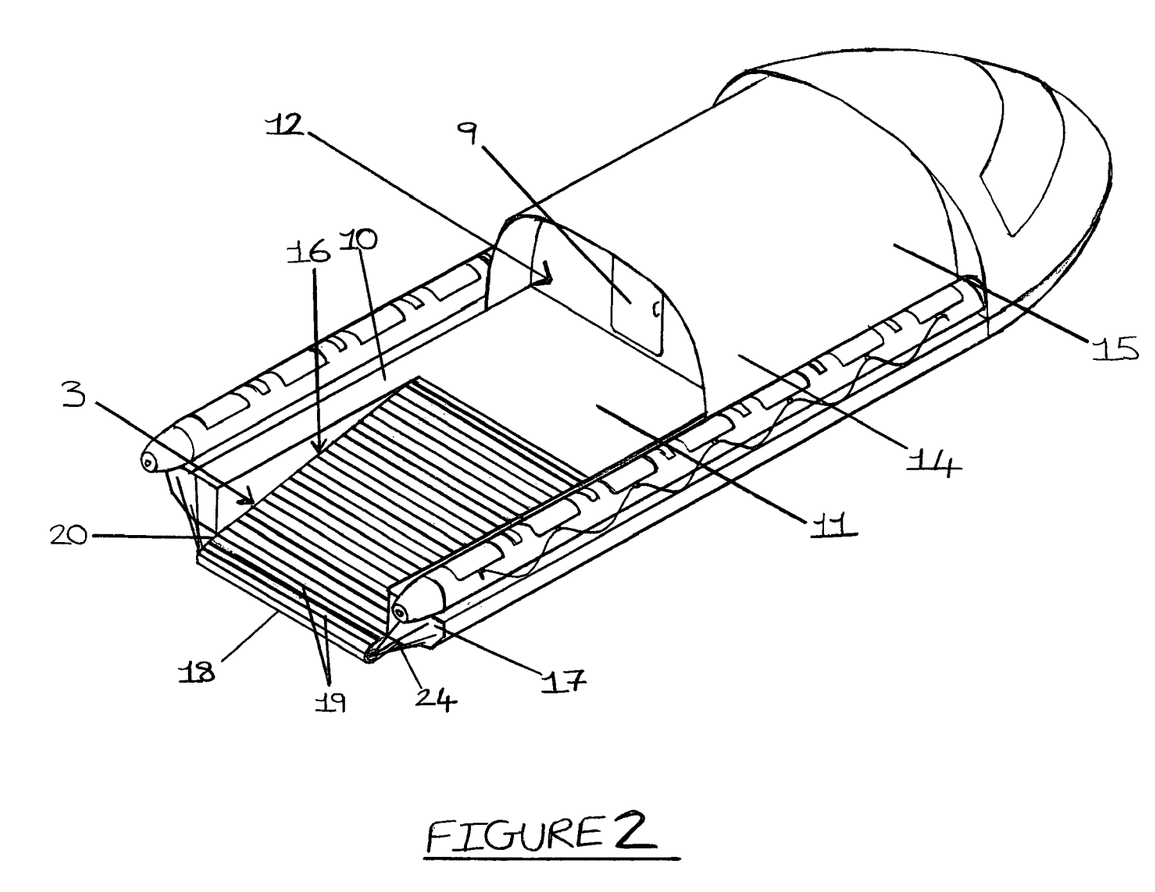
FIG. 2 is a three quarters stern perspective view of the lifeboat of FIG. 1.
Figure 3:
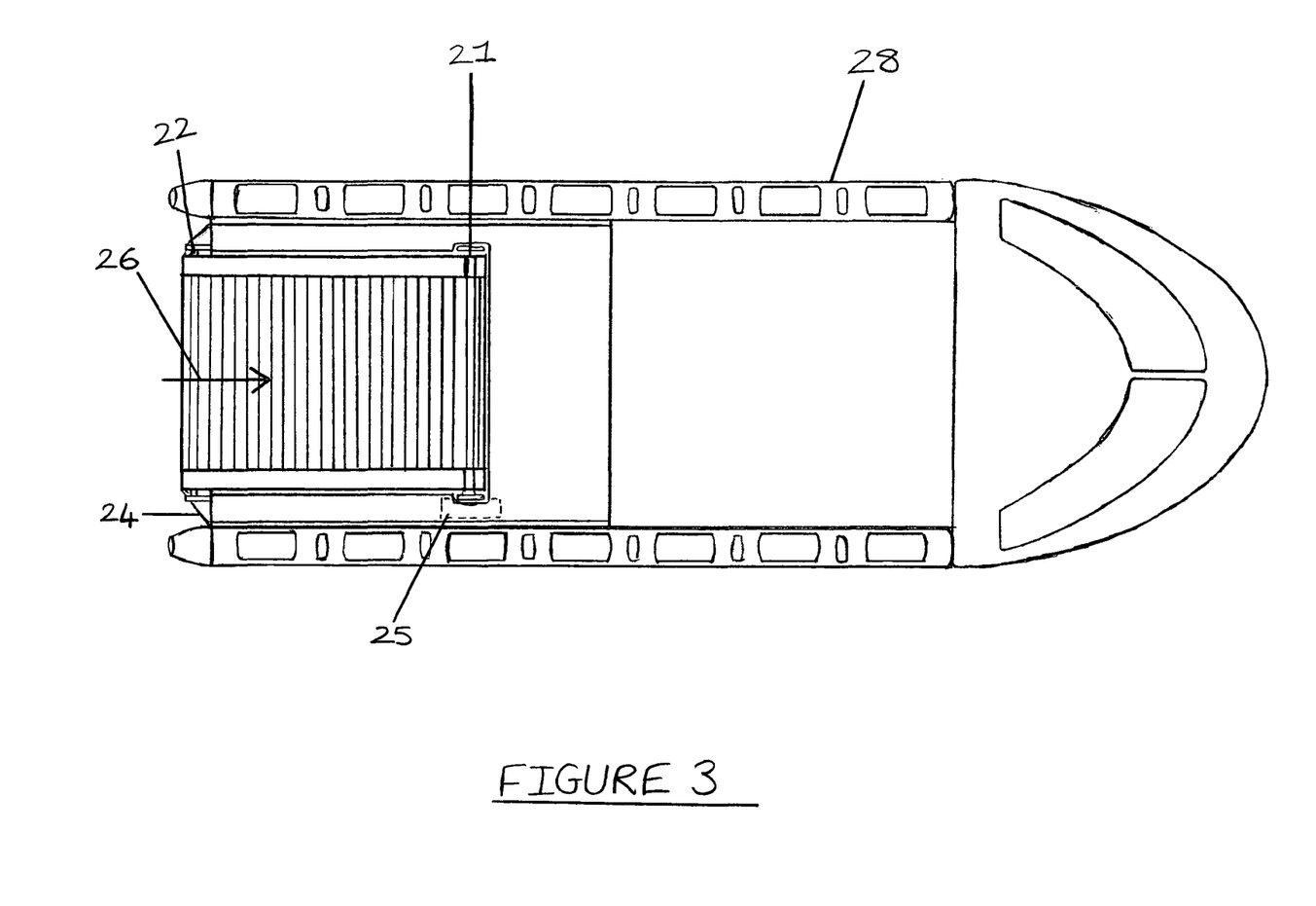
FIG. 3 is a plan view of the lifeboat.

The ramp comprises a series of cross bars 19 of a readily gripped diameter. The bars are linked by edge belt 20 and pass around upper/forward and lower/aft shafts 21,22 on sprockets 23. The lower shaft is journalled on brackets 24 attached to the transom. The upper shaft is journalled in the cut-out and extends sideways below the aft deck 10, where a drive motor and gearbox 25 is mounted. In use, the ramp is driven to move the bars in the upper run 26 forwards out of the water to assist survivors in boarding the lifeboat. No gaps exist between sides of the ramp and hull sides of the cut-out, whereby a survivor cannot get caught in such a gap. The ramp will normally be wide enough for two survivors to be lifted by it side-by-side on the ramp. It is anticipated that survivors may be weak or have lost consciousness whereby all lifting must be by the ramp conveyor.

As usual, the sides of the lifeboat are provided with grab ropes 27, with which survivors can make their way to the stern. Further it is provided with a soft strake 28 at the water line to cushion survivors from buffeting.

The lifeboat is provided with an electrically-driven, water-jet propulsion system having separate port and starboard units 29, ingresses 30 and egresses 31, with batteries stowed beneath the accommodation.

Without limitation, the lifeboat is intended to be kept on a fixed, floating or movable installation, to which or close to which personnel are likely to be working and/or transported, and stowed for unmanned freefall launching. To enable it to reach the vicinity of the survivors and approach them closely it is provided with two respective guidance systems.

Figure 4:
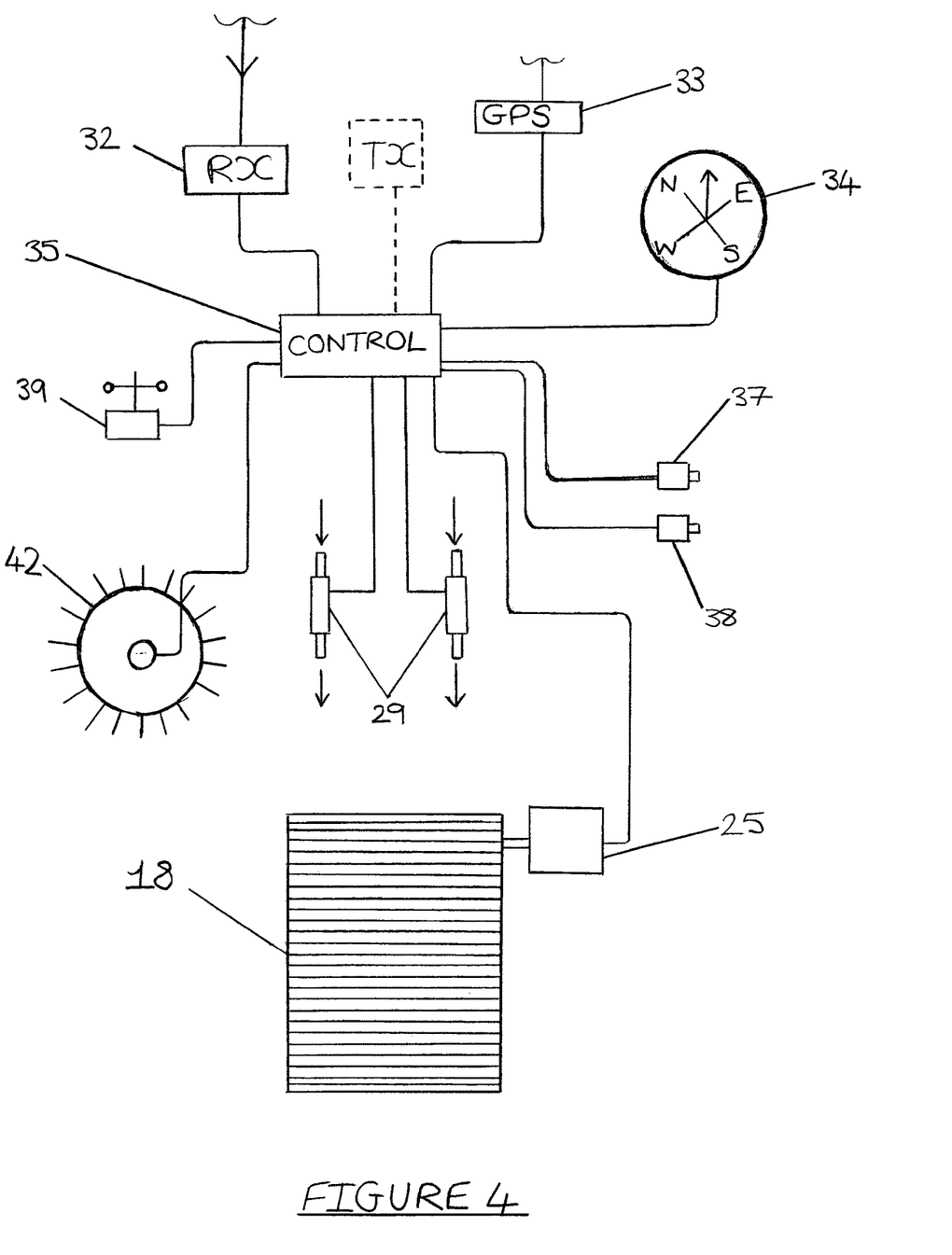
FIG. 4 is a block diagram of a control circuit of the lifeboat.

For guidance to reach the vicinity of the survivors, the lifeboat is equipped with a communication apparatus including a receiver 32 for receiving survivor location data. Whilst the receiver may be adapted to receive only some of the following, ideally it is adapted to receive all of them:
1. Satellite relayed heading data from a survivor worn PLB (Personal Locator Beacon) or EPIRB (Emergency Position Indicating Radio Beacon) device;
2. The same data, including in addition GPS/latitude and longitude coordinates;
3. Heading and/or coordinate data received direct from a PLB or EPIRB device;

4. Survivor coordinate data received from a base station, typically estimated from a last known position of a survivor transport vehicle such as a helicopter, as from an ELT (Emergency Locator Transmitter) or an SART (Search And Rescue Transponder) or an AIS-SART, an AIS being an Automatic Identification System;
5. In short any known survivor locator.

In addition, the navigation apparatus with which the lifeboat is equipped includes a GPS system 33 of its own, a compass 34. The lifeboat is also equipped with a control system 35. The latter computes a course to the survivors by comparing its and survivor positions. The control unit has an output module 36 for controlling the propulsion units to drive the lifeboat to the survivor position, making a final approach at slow speed. The control system is also programmed to perform a search around a last known survivor position in case they cannot be otherwise located, taking account of dead reckoning due to wind and tide.

Once within the location of the survivors, i.e. within tens of metres, but not close enough for him/her/them to necessarily swim to and board the lifeboat, the control unit is adapted to use direct survivor location. For this it is provided with visible light, binocularly arranged cameras 37 mounted atop the bridge to scan the surrounding sea and detect survivors, typically by recognising their survival suits by their yellow colour. In addition infrared cameras 38 are mounted adjacent the visible light cameras for detecting heat emitted from the faces of the survivors. The individual survivors may be identified by the control unit by numbers on their suits and/or even facial recognition technology. A wind direction and speed meter 39 is also provided. The control unit then manoeuvres the lifeboat to be head to wind, upwind of the survivors and drop down wind to them positioning it with a nearest one of the survivors at the ramp for him/her to grasp bars of the ramp and be pulled aboard, the ramp having been activated. For this operation, the cameras can traversable between forward facing and aft facing. Indeed additional aft facing cameras or indeed "360°" cameras, having several individual cameras built in a single unit, may be provided. This operation and indeed the initial approach to the survivors can be fully under the control of the control unit; or alternatively control can be by a remote operator, utilising the GPS information and the camera information transmitted to the operator. The control unit is expected to be able to utilise PLB data etc, provided that a plurality of PLB devices can be discriminated. Further the control unit is preferably programmed to keep track of the relative position of multiple survivors, including the ability to memorize the expected position of one or more survivors temporarily out of sight behind a wave.

Once a first survivor is aboard, as detected by cameras/detectors 40 mounted in the shelter 12, he/she can be instructed by written or broadcast message to open the bulkhead door 9 and enter the accommodation 6 if able. Further cameras 41 at the wings of the bridge detect survivors at the sides of the lifeboats and further messages encourage them to make their way to the stern and use the ramp for boarding.

Additional messages instruct any survivor able to con and/or assist in locating survivors by human eye to use the companionway ladder to reach the bridge and assist in accordance with messages displayed there. The control unit may be adapted to interpret an inexperienced survivor's sharp turning of a wheel 42 as a general indication of direction to a survivor and manoeuvre the lifeboat to avoid a broach in high wind/seas.

Once a determined count of survivors has been reached as having boarded, the lifeboat can be conned remotely or under control of the control unit to a predetermined port.

The invention is not intended to be restricted to the details of the above described embodiment. For instance, a mast may be provided with the cameras mounted on a yard extending laterally for binocular spacing of the cameras. Further, the bars of the ramp may be replaced by a more continuous ramp still having formations by which a casualty can grip the ramp surface or be gripped by it to be conveyed up the ramp. The formations can be in the nature of cleats on a tracked vehicle's track. The ramp can have an open or aperture structure, bearing in mind the advantage of an open structure in allowing water flow through the ramp. The material of the ramp is advantageously tacky or otherwise has an enhanced frictional surface, which avoids the need for grips and potential snagging points.

Figure 5:
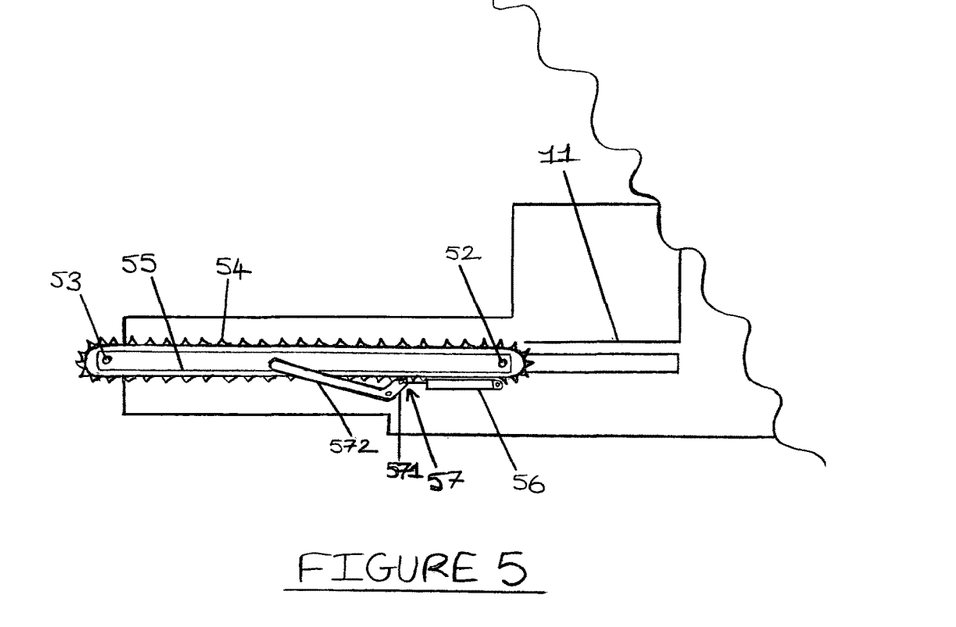
FIG. 5 is a diagrammatic side view of a modified powered ramp for the lifeboat of the invention in a raised position.
Figure 6:
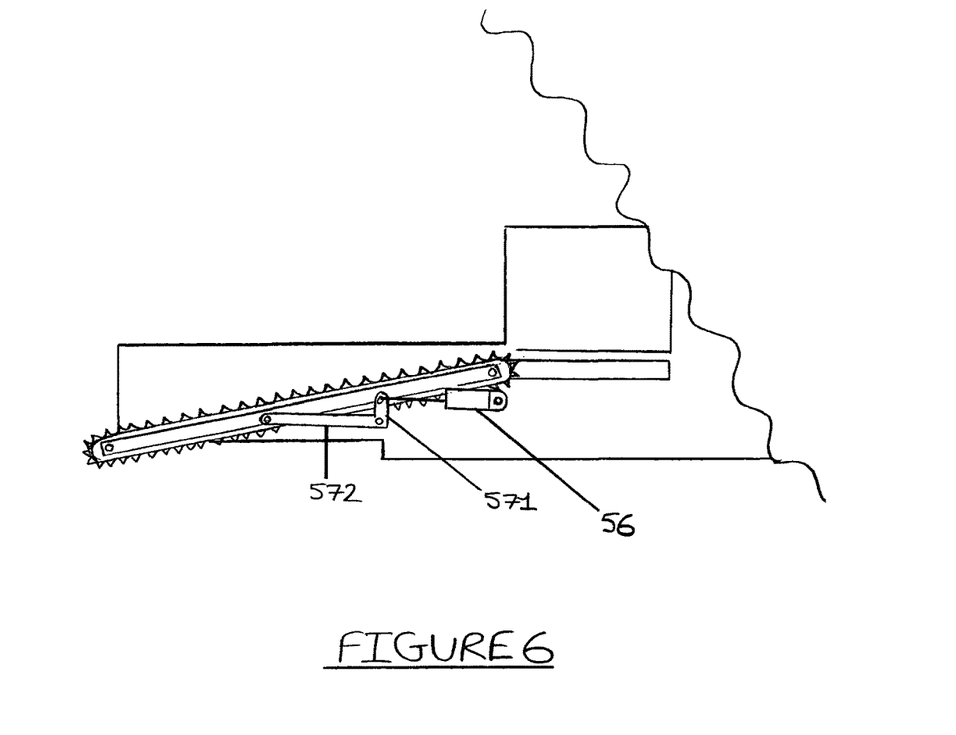
FIG. 6 is a diagrammatic side view of a modified powered ramp for the lifeboat of the invention in a raised position.

As shown in FIGS. 5 and 6, the ramp can have a frame 51 carrying front and back shafts 52,53, around which the ramp's conveyor 54 runs. The frame has sideways opening channels 55. It is pivoted about the front shaft, allowing the back to be raised into which it is parallel with the aft deck portion 11 and a deployed position in which the back end including the back shaft 53 is below water. An hydraulic actuator 56 and bell-crank 57 mechanism is provided each side of the ramp towards its back end for its raising and lowering. With the actuators arranged fore-and-aft and engaging one arm 571 of the bell-crank, the other 572, via a roller in the side channel determines the height of the ramp.

The entire ramp can be extended from a stowed position with its forward end beneath the deck part 11 and its back end within the transom, to a use position in which the back end is extended and the forward end is level with the aft end of the deck part 11. For this a hydraulic motor (not shown) for actuating the ramp is carried on the frame and movable with the ramp, whilst remaining hose connected to an actuating pump. The deck part 11, or another otherwise non-adjustable length of deck, can be provided with a conveyor driven in synchronisation with the deployed ramp, whereby casualties are assisted clear of the deployed lamp.

Other arrangements of conveyor ramp can be envisaged, such as the deployable ramp being pivoted at its aft end when not deployed and able to be pivoted from this end in the manner of a book being opened to extend over the transom into the water. In this arrangement, the useful ramp surface is on the underside when closed and the topside when deployed.

Provided that it is consistent with freefall launching, and indeed where other forms of the launching are possible, shrouded and/or vectored thrust propellers can be provided in place of the water jet propulsion units. Further the propulsion units need not be battery driven and could be diesel or diesel-electric. The unit may have a single jet unit with side thrusters for maneuverability. Again so called "azipod" drive is possible.

Figure 7:
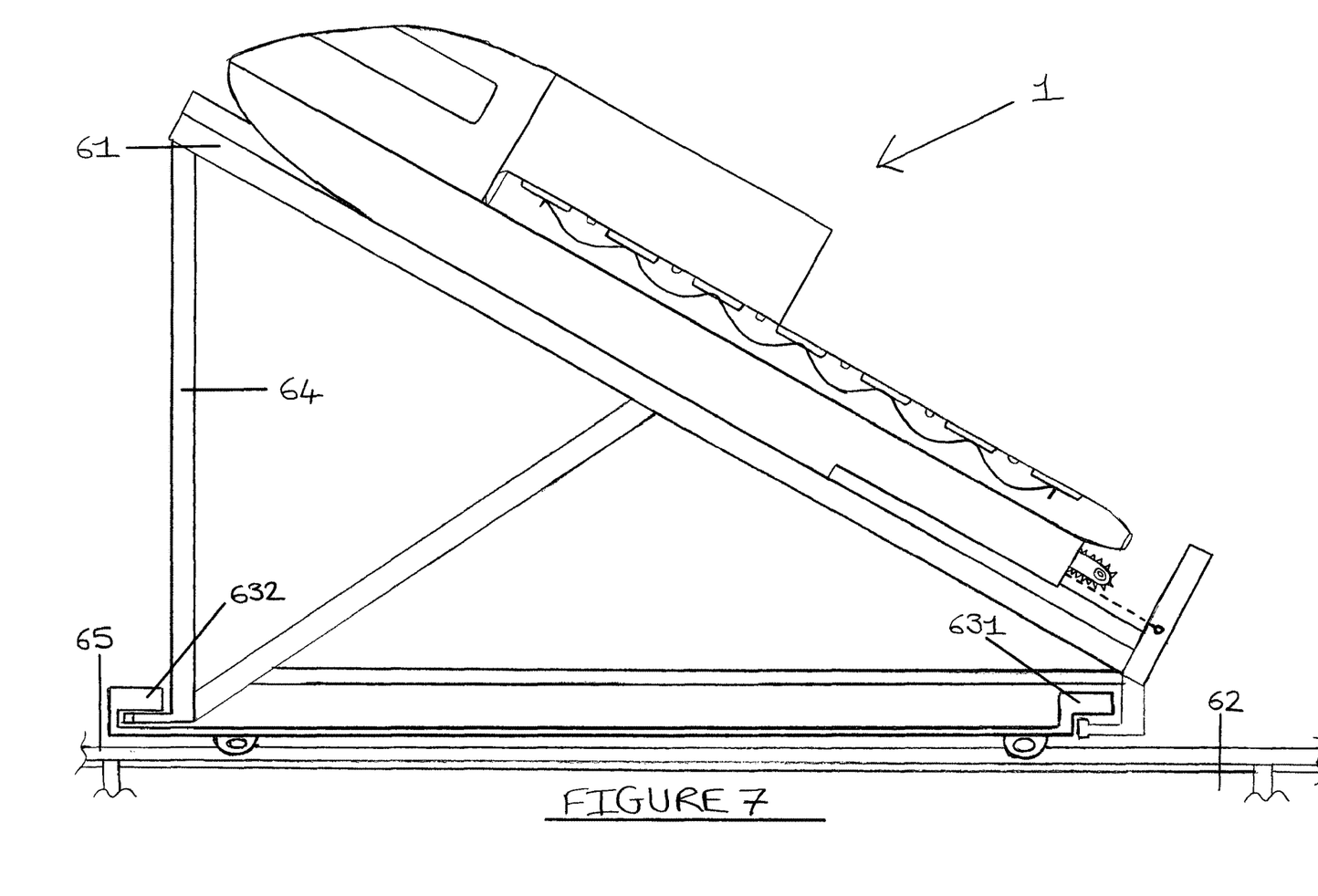
FIG. 7 is a diagrammatic view of a lifeboat of the invention installed on a slide for launching and FIG. 8 FIG. 9 & FIG. 10 are respective side, plan and side views corresponding to FIGS. 1, 3 and 7 of another lifeboat of the invention with corresponding features in corresponding positions.
Figure 8:
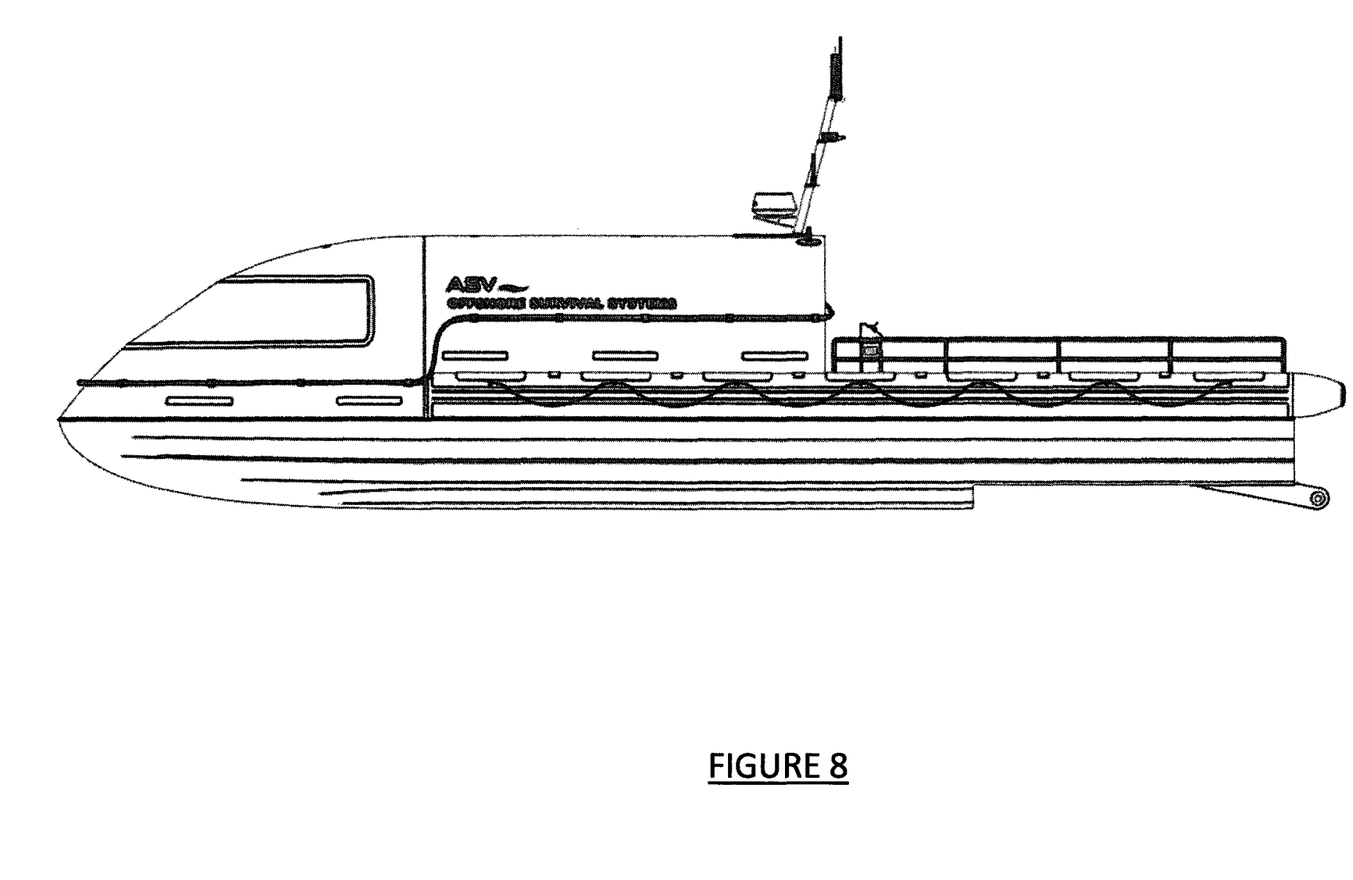
Figure 9:
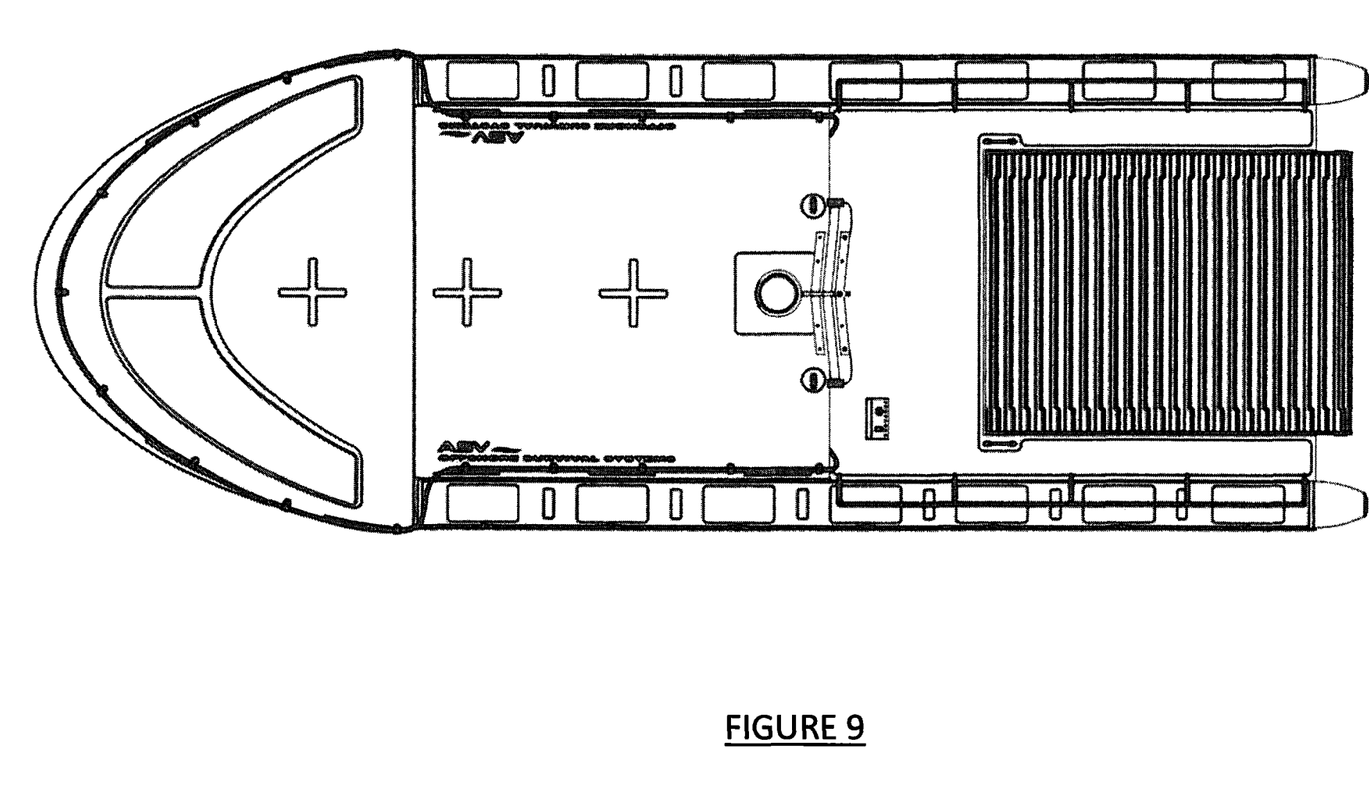
Figure 10:
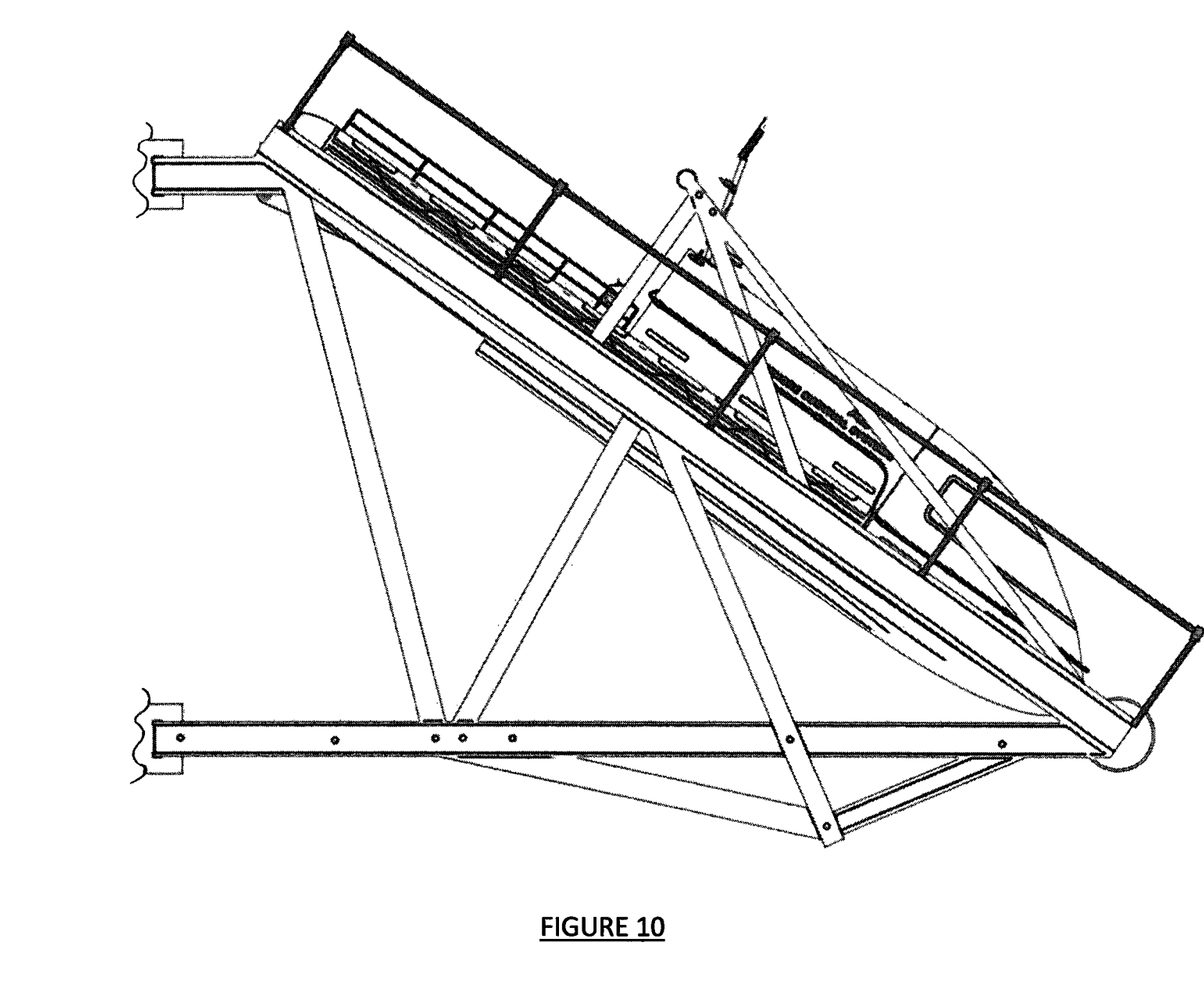

For such launching the lifeboat can be installed on a slip or slide 61. In particular this can, as shown in FIG. 7, be mounted on a structure 62 such as a wind turbine mast or other off shore structure, above the wave splash zone. In the case of a wind turbine mast, the latter can be provided with two rings of rails 631,632 on which a slide support structure 64 is mounted so as to be able move around the mast under action of the wind in the manner of a weather vane. This arrangement provides that the lifeboat will be facing away from the wind and wind driven waves for launch.

The ring rails can be liftable on vertical rails 65, as by a rack and system (not shown). The vertical rails are installed on the mast with sufficient length that ring rails, slide and its support structure are able to be lowered to the water level for positioning of the lifeboat on the slide. Then they are all lifted up to a height of the lifeboat being above the splash zone. Typically the lifeboat is installed 10 to 15 metres above the mean sea level.

It is envisaged that mechanisms could be provided on the slide and support structure for holding the lifeboat prior to launch. However, in so far as the launch is likely to be initiated by a signal received by the lifeboat's communication apparatus. Typically this can be arranged to release a mechanism 66 such as a pelican hook quick release mounted at the stern of the lifeboat attaching it to a chain fast with the support structure. Thus the chain only holds the life boat from free fall launch. The pelican hook can be replaced by an explosively released bolt.

The system can be duplicated, with a secondary securement normally being engaged, but released prior to operations in the vicinity of the life boat, by receipt by the communication of a standby signal in case of need of the lifeboat. On cessation of the operations, the secondary securement can be reinstated by receipt of a stand down signal.

It can be expected that in the envisaged use of the lifeboat, in particular offshore, that survivors requiring rescuing will be wearing at least life jackets and normally survival suits and that these will be equipped with personal locator beacons ("PLBs"). Some PLBs transmit signals enabling tracking satellites to transmit to earth information for fixing the position of the PLB, whilst others in addition have GPS capability, whereby they can compute their position and transmit this directly.

Further for protection of the lifeboat, whilst stored for long periods, it can be house in a shroud on the launching platform and launched through opening doors.

The invention claimed is:

1. An unmanned lifeboat, comprising:
    a self-righting hull with a transom opening;
    a closed onboard casualty accommodation,
    a propulsion unit and a steering gear,
    a navigation apparatus,
    a communication apparatus having a standby mode and adapted to receive an activation signal and a casualty's position and
    a controller operatively connected to the propulsion unit, the steering gear, the navigation apparatus and the communication apparatus, the controller being for:
        activating the propulsion unit and the steering gear in response to receipt of the activation signal by the communication apparatus and
        conning the lifeboat in co-operation with the navigation apparatus towards the casualty position without onboard crew control and
    an aft deck, wherein the aft deck is generally U-shaped comprising a cut-out forming the transom opening to provide a portion of the transom of the hull which is lower than the rest of a gunwale or transom of the hull via which the casualty can haul him/herself or be hauled aboard without on-board crew assistance,
    wherein:
        there is a powered conveyor ramp at the portion of the transom of the hull via which the casualty can haul him/herself or be hauled aboard without on-board crew assistance within the cut-out of the aft deck, wherein the ramp is level with the aft deck at its forward end and slopes down to the transom and arranged to haul the casualty through the transom opening.

2. A lifeboat according to claim 1, wherein the lifeboat is adapted to operate autonomously.

3. A lifeboat according to claim 1, wherein the lifeboat is adapted to operate under control from a remote station with receipt of conning instructions by the communication apparatus for the controller.

4. A lifeboat according to claim 1, wherein the controller is adapted to control the propulsion unit for a two stage approach enabling a relatively fast approach to a vicinity of the casualty and a relatively slow approach to the casualty per se.

5. A lifeboat according to claim 4, wherein the controller is adapted to con the lifeboat on the basis of radio transmission of the casualty's position during the fast approach, wherein the radio transmission is of the casualty's coordinate position and/or radio transmission indicating a direction to the casualty.

6. A lifeboat according to claim 4 including means for detecting the casualty on the surface of the sea for the controller to con the lifeboat to the casualty during the slow approach.

7. A lifeboat according to claim 6, wherein the casualty detection means is camera based.

8. A lifeboat according to claim 7, including a lamp for lighting the casualty with light to which the camera is sensitive for illuminating water around the casualty for reflection from the casualty to be received by the camera.

9. A lifeboat according to claim 6, wherein the casualty detection means is camera based with two binocularly arranged cameras.

10. A lifeboat according to claim 1, including wind and/or sea-state detection means, the controller being adapted to hold the lifeboat head to wind and/or sea-state with a casualty in the lee of the life boat and to manoeuvre the low portion of the lifeboat towards the casualty.

11. A lifeboat according to claim 10, comprising:
    means for detecting the casualty on the surface of the sea for the controller to con the lifeboat to the casualty during the slow approach,
    wind and/or sea-state detection means, the controller being adapted to hold the lifeboat head to wind and/or sea-state with a casualty in the lee of the life boat and to manoeuvre the low portion of the lifeboat towards the casualty and
    means for transmitting wind and/or sea-state data and casualty images to the remote station for conning signal transmission to the control means for maneuvering towards the casualty.

12. A lifeboat according to claim 1, wherein the ramp is adapted for
    lowering of its distal end into the water and/or extension beyond the transom for casualty recovery and
    raising the distal end from the water and/or retraction within the transom when under way.

13. A lifeboat according to claim 1, wherein the life boat is equipped for manual control, to enable a survivor once on board, to control it.

14. A lifeboat according to claim 1, wherein the life boat is adapted for free fall launch.

15. A lifeboat according to claim 1 in combination with a launching slip or slide, the slip or slide and/or the lifeboat being provided with means for releasing the lifeboat on receipt of the activation signal.

16. A lifeboat according to claim 1, wherein the powered conveyor ramp is for hauling the casualty aboard.

\* \* \* \* \*